(12) United States Patent
Leblanc

(10) Patent No.: US 9,073,247 B2
(45) Date of Patent: Jul. 7, 2015

(54) BIASING WEDGE FOR USE WITH CALENDERING DRIVES PROCESSING ELASTOMERIC MIXES

(75) Inventor: Mathieu Leblanc, Mozac (FR)

(73) Assignees: MICHELIN RECHERCHE et TECHNIQUE S.A., Granges-Paccot (CH); COMPAGNIE GENERALE DES ESTABLISSEMENTS MICHELIN, Clermont-Ferrand (FR)

( * ) Notice: Subject to any disclaimer, the term of this patent is extended or adjusted under 35 U.S.C. 154(b) by 386 days.

(21) Appl. No.: 13/562,458

(22) Filed: Jul. 31, 2012

(65) Prior Publication Data

US 2014/0035188 A1 Feb. 6, 2014

(51) Int. Cl.
*B29C 43/24* (2006.01)
*B29C 43/48* (2006.01)

(52) U.S. Cl.
CPC ........... *B29C 43/24* (2013.01); *B29C 2043/486* (2013.01)

(58) Field of Classification Search
CPC ............................... B29C 43/24; B29C 43/46
USPC .................................. 264/175; 425/363, 365
See application file for complete search history.

(56) References Cited

U.S. PATENT DOCUMENTS

| 743,403 | A |   | 11/1903 | Smith |   |
|---|---|---|---|---|---|
| 1,831,531 | A | * | 11/1931 | Harber | 425/168 |
| 2,333,629 | A |   | 7/1941 | Beadle, Sr. |   |
| 2,693,154 | A | * | 11/1954 | Appleton | 425/367 |
| 3,841,800 | A |   | 10/1974 | Ohrberg et al. |   |
| 3,841,899 | A |   | 10/1974 | Siedenstrang |   |
| 4,043,731 | A |   | 8/1977 | Kratzmann et al. |   |
| 4,221,022 | A |   | 9/1980 | Iida |   |
| 4,444,361 | A |   | 4/1984 | Nuttall |   |
| 4,871,409 | A | * | 10/1989 | Perkins | 156/110.1 |
| 2001/0042452 | A1 |   | 11/2001 | Hirose et al. |   |
| 2011/0036485 | A1 | * | 2/2011 | Rey et al. | 156/117 |

FOREIGN PATENT DOCUMENTS

| GB | 620340 | 3/1949 |
|---|---|---|
| GB | 856454 | 12/1960 |
| JP | 08-197558 | 7/1975 |
| JP | 09-201838 | 8/1997 |

* cited by examiner

*Primary Examiner* — Galen Hauth
(74) *Attorney, Agent, or Firm* — Dority & Manning, P.A.

(57) ABSTRACT

A method and apparatus are provided for automatic and hands-free threading of an elastomeric mix into a calender set of rolls comprising one or more pairs of rolls that have a nip between them. A wedge is provided with a tip that is positioned downstream from the nip and at a predetermined distance from the nip. As the rolls of the nip are rotated, the tip of the edge removes all, or a desired portion of, the elastomeric mix from a first roll of the nip so as to transfer the elastomeric mix to a second roll of the nip. The tip of the wedge may be placed into contact with the first roll. The wedge may also have an arcuate surface, shaped e.g., like the outer surface of the first roll, and positioned a predetermined distance from the outer surface of the first roll.

13 Claims, 6 Drawing Sheets

BIASING WEDGE FOR USE WITH CALENDERING DRIVES PROCESSING ELASTOMERIC MIXES

FIELD OF THE INVENTION

The subject matter of the present disclosure relates generally to a method and apparatus that allow for automatic and hands-free threading of an elastomeric mix into a calender set of rolls comprising one or more pairs of rolls that have a nip between them.

BACKGROUND OF THE INVENTION

Calenders are mechanisms that include a series of pairs of rolls through which a substance that is malleable can be run in order to smooth out the material and form a skim or sheet of uniform thickness. In the tire industry, calenders are used to process an elastomeric or rubber mix that is usually extruded and then sent through the calender to create a sheet of rubber or elastomer mix. Between each pair of rolls is a gap or nip through which the material is run as the rolls are rotated. Depending on a host of processing variables, the sheet will assume some thickness that is proportional to the width of the nip. Often, the material is fed through three sets of rolls and nips in order to create a homogenous and smooth sheet that also has a desired thickness, as is the case for an inverted "L" configured calender as will be described shortly. This sheet is then used to create some portion of the tire, such as the tread or other semi-finished goods used to manufacture and assemble the tire such as belts and carcass plies, etc.

An illustration of such a typical calendering system 10 is shown in FIGS. 1 and 2, which has three pairs of rolls (labeled as rolls 12, 14, 16, and 18) with a nip between pairs as well as a fifth roll 20, sometimes referred to as a take-off roll, that takes the sheet as it comes off the fourth roll 18. The purpose of this roll 20 is to provide tension to remove the sheet 22 as it exits the calender. The calender rolls that are part of a pair rotate in opposite directions or in the same linear direction/surface direction in the nip area 24 so that material that is fed into the entrance 26 of the nip is forced through the nip into the exit area 28 of the nip. For the first pair of rolls, the entrance of the nip is located above the rolls so that material is naturally fed into the nip via gravity upon startup or just before. Usually, a bank 30 of kneaded material (sometimes referred to as a bourelet by the inventor(s)) collects above the nip of the first pair of rolls so that enough material is present to form an uninterrupted sheet of material that can pass through the calendering system. This bank is created by over-supplying slightly the amount of material needed to create the sheet of material from a source of the material such as an extruder. In time, material is forced downward into the nip by the rotation of the rolls.

After exiting the first nip area 24a, the material then winds in a counterclockwise direction around the second roll 14 until it is reaches the third roll 16 where it goes through a second nip area 24b. Once it exits, the material then winds in a clockwise direction around the third roll 16 and then encounters the fourth roll 18 where it goes through the third nip area 24c. At this point, the sheet then attaches to the fourth roll 18 where it is rotates in a counterclockwise direction once more around the bottom and part of the back of the fourth roll 18 and on top of the fifth roll 20, which is rotated in the clockwise direction and which is biased upwards to place the sheet in tension before it proceeds to a production center where some tire component is made using the sheet of material. This desired path is shown by the solid outline of material whereas an unintended circulation of material is represented by the dashed arrows as will be described in further detail later.

All the rolls or pairs of rolls can be commonly driven by a single motor using gears, chains, or belts. In such a case, the speed of all the rolls or of the rolls of a pair can be the same or can be different utilizing some sort of transmission system such as a variable speed ratio reducer between the rolls and the motor. Alternatively, all the rolls can be independently driven using a separate motor for each roll. In that case, electronic controls are sometimes furnished that allow tight and independent control of the speed of each roll by way of suitable programming by the operator or some other control algorithm executed by a computer. For example of rolls that are independently driven or that can operate at different adjustable speeds. See, e.g., U.S. Pat. Nos. 2,333,629; 4,444,361; and G.B. Pat. Nos. 856,454; 620,340.

An example of a production center that can be fed by a calender system is depicted by FIG. 3, which is disclosed in U.S. Patent Application Publication No. 20110036485, which is commonly owned by the assignee of the present invention and whose content is incorporated by reference for all purposes in its entirety. Portions of that application are reproduced herein as follows to describe how the process works and how it can be used in conjunction with the present invention. It should be noted that this is given by way of an example of a production center and that the present invention is equally applicable to any manufacture of a tire component that requires a calendering system of any sort including those that only have a single pair of rolls.

A system 110 for generating a multi-layered tire component in accordance with the methods described in the '485 application is generally shown in FIG. 3. System 110 generally operates to form a multi-layered tire component by winding strips 141 about a building surface. Because a tire component is a wound product, it generally forms a complete circle (i.e., a ring). The component is also referred to herein as a band. Also, system 110 generates a sheet 121 from which the strips 141 are formed, and, in particular embodiments, the sheet 121 remains continuous as it travels along a closed-loop path to and from a sheet generator 120. Accordingly, system 110 automatically returns any unused sheet material for reuse by generator 120. System 110 generally forms elastomeric tire components, such as, for example, tread, sub-tread, and cushion gum. It can also create a multi-layered band that is a profiled tire tread band.

In this embodiment, system 110 comprises a sheet generator 120, a cutting assembly 140, a strip applicator assembly 160, a recovery assembly 170, and a programmable logic control (not shown). System 110 may also include a roll assembly 130 for directing a sheet 121 from generator 120 to cutting assembly 140. Sheet generator 120 generally transforms input material 112 into a sheet 121, which is ultimately cut into strips 141 by cutting assembly 140.

With continued reference to FIG. 3, input material 112 is received through inlet 122, and may comprise new material 112a and/or previously used material 112b supplied by recovery assembly 170. After receiving input material 112, generator 120 forms the input material by any known means such as by a calendering system shown in FIGS. 1 and 2 and described above into sheet 121, where sheet 121 is formed to any desired width and thickness. Sheet 121 is expelled from generator 120 by way of outlet 123.

In one embodiment, as shown in FIG. 3, generator 120 comprises an extruder. Extruders generally push input material 112 through a die or head, such as by way of a screw. Any extruder known to one of ordinary skill in the art may be used by system 110. Generator 120 may also comprise a calender in lieu of, or in addition to, an extruder, which may comprise a pair of rolls positioned in close proximity to each other to form a gap or nip, through which input material 112 passes to from a sheet 121 (as described above). The resulting sheet 121 includes a width associated with the width of the calender nip. While an extruder and calender are capable of operating at similarly high speeds, a calender may not be as readily adjustable to changes in speed. This may affect the start-up time of system 110, as well as the responsiveness of system 110 to restart after a temporary delay.

As shown in FIG. 3, a roll assembly 130 may be located between sheet generator 120 and cutting assembly 140. Roll assembly 130 generally comprises one or more rolls 132 arranged to form a translation path of sheet 121. The take up roll described above in FIGS. 1 and 2 may be considered as such a roll. The particular translation path directs sheet 121 to cutting assembly 140, and may be used to tense sheet 121 as desired. The location of rolls 132 may be adjusted to impart more or less tension on sheet 121, which may also provide a means for adjusting the cross-sectional dimensions of sheet 121. One or more rolls 132 may be driven or powered, such as, for example, by a motor, to assist in the translation of sheet 121, and/or adjustment of tension in sheet 121. In addition, biasing means such as springs, pneumatic or hydraulic cylinders, etc. may force the roll against the sheet to provide tension. Sheet 121 may also be tensed by creating a speed differential between drum 125 and/or cutting drum 152, by increasing or decreasing the rotational speed of either drum.

Cutting assembly 140 generally forms strips 141 from sheet 121 for subsequent assembly of the tire band. More specifically, cutting assembly 140 utilizes a plurality of cutting members 142 to cut strips 141, wherein each cutting member 142 includes a cutting edge 143. Cutting members 142 generally are spaced along a length of sheet 121, and along a circumference of cutting surface and/or cutting drum 152. In the embodiment shown in the FIGURES, cutting members 142 are rotating knives. Rotating knives, in the embodiment shown, operate similarly to idler wheels, and freely rotate at the direction of the translating sheet 121. Still, rotating knives 142 may be driven by a motor or any other known driving means. Also, other means for cutting sheet 121 known to one of ordinary skill in the art may be used in lieu of rotating knives, including other non-rotating knives, blades, or edges.

With general reference to FIG. 3, system 110 also includes an applicator assembly 160 for applying one or more continuous strips 141 to a building surface to form a band. The one or more strips 141 are wound about the building surface to form the multi-layered band. Applicator assembly 160 includes an applicator drum 162 that transfers one or more strips 141 there from to building assembly 180. To provide adhesion between applicator drum 162 and strips 141, which promotes the separation of strips 141 from sheet 121, applicator drum 162 may be heated or cooled. In particular embodiments, applicator drum 162 is maintained at a temperature at least 10 degrees Celsius higher than the temperature of sheet 121 and/or any strips 141. In other embodiments, applicator drum 162 is maintained at approximately 70 degrees Celsius. The surface of applicator drum 162 may comprise a smooth surface, which may be a chromed or hot chromed surface, so to provide a smooth, capillary-like surface that may promote molecular bonding and/or may operate like a vacuum to facilitate retention of strips 141 thereon. Improved adhesion may also be provided by providing a rough surface, the rough surface providing increased surface area for improved contact area, and therefore, increased adhesion. Applicator drum 162 may also operate as the cutting drum 152. Further, the temperature controls and conditions, as well as the surface conditions and treatments discussed with regard to applicator drum 162 above may also be applied to cutting drum 152 to improve adhesion between drum 152 and sheet 121. Using this system, tread features can be built onto a green or uncured tire layer by layer.

As just described regarding the applicator or cutting drum, the adhesion of rubber strips to a round and rotating surface is apt to occur. Accordingly, when multiple rotating surfaces are present near the exit of the nip of calender rolls, e.g. their respective circumferential surfaces that are rotating away from nip exit, a sheet of elastomeric mix can bond with either of these surfaces, or partially to both at the same time. This can be a problem during the operation of the calender, but especially during the initialization or start-up of the calender as an initial sheet needs to be directed, often by an operator, to follow the proper path until the calender has been successfully "threaded" and is ready to supply a sheet of material to the desired production center. This requires shut-down of the equipment for safety reasons, which can be costly.

Looking back at FIG. 2, the desired path is denoted by a solid outline of material and an unwanted path by dashed arrows. As can be seen, the first unwanted path can occur when the sheet sticks to the first roll 12 where it rotates clockwise away from the exit 28a of the first nip 24a. This can lead it back to the top bank 30a of kneaded material, creating an undesirable feedback loop where excessive material will spill off the axial ends of the roll and down the sides of the calendering apparatus, potentially causing damage to the apparatus or other equipment by gumming up the equipment and stopping production. A similar situation can occur when the sheet exits the second nip 24b as it can continue to run clockwise on the second roll 14 and into the top bank of material 30a. After the third nip 24c, the material can recycle itself back to the second nip 24b, creating unwanted growth of a second bank 30b of material. Finally, after the sheet comes back around the bottom of the fourth roll 18, it can continue to stick to this roll and create a third bank 30c of material near the entrance 26c of the third nip 24c.

Any of these banks of material can become too large and cause the equipment problems. Even after initially threading the calender, all three banks can occur due to some small residue sticking to the rolls and collecting near the entrance to the nips over time, thereby causing some small amount of recycling. Also, there is a desired amount of slight oversupply from each nip to the next that helps to ensure enough material is present for the step reduction in skim thickness at each nip which creates a full width sheet that is smooth, homogenous and that has the correct thickness. So, it is desirable to control the size of the banks of material but not to eliminate them altogether.

The reason elastomeric mixes are tacky will now be explained. Suitable compositions for making a sheet for use in tire components such as treads include those rubber compositions having a glass transition temperature within a defined range, said rubber compositions being based upon a diene elastomer, a plasticizing system and a cross-linking system. The diene elastomers or rubbers that are useful for such rubber compositions are understood to be those elastomers resulting at least in part, i.e., a homopolymer or a copolymer, from diene monomers, i.e., monomers having two double carbon-carbon bonds, whether conjugated or not.

In summary, typical diene elastomers include highly unsaturated diene elastomers such as polybutadienes (BR), polyisoprenes (IR), natural rubber (NR), butadiene copolymers, isoprene copolymers and mixtures of these elastomers. Such copolymers include butadiene/styrene copolymers (SBR), isoprene/butadiene copolymers (BIR), isoprene/styrene copolymers (SIR) and isoprene/butadiene/styrene copolymers (SBIR). Suitable elastomers may also include any of these elastomers being functionalized elastomers.

In addition, the elastomeric composition disclosed herein may further include a reinforcing filler. Reinforcing fillers are added to, inter alia, improve the tensile strength and wear resistance of the material. Any suitable reinforcing filler may be suitable for use in compositions disclosed herein including, for example, carbon blacks and/or inorganic reinforcing fillers such as silica, with which a coupling agent is typically associated. Inorganic reinforcing fillers may take many useful forms including, for example, as powder, microbeads, granules, balls and/or any other suitable form as well as mixtures thereof. Examples of suitable inorganic reinforcing fillers include mineral fillers of the siliceous type, such as silica ($SiO_2$), of the aluminous type, such as alumina ($AlO_3$) or combinations thereof For coupling the inorganic reinforcing filler to the diene elastomer, a coupling agent that is at least bifunctional provides a sufficient chemical and/or physical connection between the inorganic reinforcement filler and the diene elastomer. Examples of such coupling agents include bifunctional organosilanes or polyorganosiloxanes. Such coupling agents and their use are well known in the art. The coupling agent may optionally be grafted beforehand onto the diene elastomer or onto the inorganic reinforcing filler as is known. Otherwise it may be mixed into the rubber composition in its free or non-grafted state.

In addition to the diene elastomer and reinforcing filler, particular embodiments of the rubber composition disclosed herein may further include a plasticizing system. The plasticizing system may provide both an improvement to the processability of the rubber mix and/or a means for adjusting the rubber composition's glass transition temperature and/or rigidity. Suitable plasticizing systems may include a processing oil, plasticizing resin or combinations thereof. Other plasticizing systems are known. Table I below provides an example of rubber mixes that may be used with the present invention and, more particularly, indicates the percentage of resin and plasticizer that may be present and the type of resin. Other mixes may be used as well. Of resin types, limonene resin is one of the stickiest and was used in tests (discussed below) to demonstrate the efficacy of the invention.

TABLE I

| Mix | % Resin | % Total Plasticizer (include oil and resin) | Resin Type |
| --- | --- | --- | --- |
| 1 | 8.7 | 21.8 | Limonene |
| 2 | 7.0 | 7.0 | Formophenolic (i.e. tackifier resin) |

Also, the rubber compositions disclosed herein may have, or be cured with, any suitable curing system including a peroxide curing system or a sulfur curing system, many of which are known in the art. Other additives can be added to the rubber compositions disclosed herein as known in the art. Such additives may include, for example, some or all of the following: antidegradants, antioxidants, fatty acids, pigments, waxes, stearic acid and zinc oxide.

These constituents, notably the polymers used in the elastomeric mix, make the sheet sticky or have tack. Increasing the amount or type of certain ingredients such as pigments, fillers, additives, and plasticizers can increase tack. Also, some polymers have inherently more tack than others. Consequently, different mixes have more tack than others and can therefore be more prone to the problems just described.

As can be imagined, a number of methods have been devised to control or eliminate unwanted sticking of the sheet of material to calender rolls. Some methods have been already described above and include providing a temperature or surface finish differential between the two rolls that define a nip so that the sheet of material is prone to stick to one versus the other. Also, surface treatments that decrease adhesion to the roll to which adherence is undesirable after the sheet exits the nip can be applied to that roll. Such treatments include TEFLON, alkanolamines, alkylene glycols, and polyalkylene glycols (see U.S. Pat. No. 3,841,899). In Japanese Patent Application Publication No. JP9201838A, there is disclosed a method of continually applying a release agent on a roll using a soft roll onto which the agent is sprayed that rubs against the roll for solving sticking problems associated with that roll. Finally, the use of scraper blades is often used to prevent the unwanted recycling of material that can contribute to bank growth over time (See Jap. Pat. Application Publication No. 08-197558 A and U.S. Pat. No. 4,221,022 for examples). Also, the use of scraper blades to prevent the improper threading of a sheet processed by a calender processing elastomeric mixes, preventing it from recycling to the entrance of the nip thereby aiding in the start-up of a calendering process is also known (see col. 3, lines 5-10 of U.S. Pat. No. 4,871,409).

However, all these methods have drawbacks. Concerning maintaining the temperature of the rolls, it is necessary to maintain consistency the entire time the calendering apparatus is running, which could be difficult depending on ambient conditions. Also, this method could delay start-up until the rolls reach the desired temperature. Surface treatments that are applied to rolls such as disclosed in U.S. Pat. No. 3,841,800 can wear off over time which adds cost to reapply the treatment and possibly some downtime for the equipment. Continuously applying a release agent can be both expensive and messy, and may cause the agent to seep into the material causing a degradation of the properties of the sheet of material. Finally, scraper blades do not allow for the automatic, hands-free threading of a calender processing an elastomeric mix as admitted by the prior art (see comments regarding U.S. Pat. No. 4,871,409 above).

Accordingly, a method and apparatus for solving the sticking issue upon start-up in a more reliable and cost-effective way without degrading the material properties of the sheet produced by the calender would be beneficial. Such a method and apparatus that can allow for the automatic and hands-free threading of the apparatus would be particularly beneficial. Additionally, such a method and apparatus that can help maintain uninterrupted and continuous production of the calendering system after startup would also be useful.

SUMMARY OF THE INVENTION

The present invention relates to a method and apparatus for automatic and hands-free threading of an elastomeric mix into a calender set of rolls comprising one or more pairs of rolls that have a nip between them. More specifically, a wedge is provided with a tip that is positioned downstream from the nip and at a predetermined distance from the nip. As the rolls of the nip are rotated, the tip of the edge removes all, or a desired portion, of the elastomeric mix from a first roll of the nip so as to transfer the elastomeric mix to a second roll of the nip. The tip of the wedge may be placed into contact with the first roll. The wedge may also have an arcuate surface, shaped e.g., like the outer surface of the first roll, and positioned a predetermined distance from the outer surface of the first roll. Additional objects and advantages of the invention will be set forth in part in the following description, or may be apparent from the description, or may be learned through practice of the invention.

In one exemplary aspect, the present invention provides a method for operating a calendering system that processes elastomeric mixes at a desired calendering rate. The calendering system includes a first roll and a second roll that form a nip therebetween. The method includes the steps of providing a wedge with an angled tip; positioning the tip of the wedge adjacent to, and downstream of, the nip; rotating an outer surface of the first roll in a first roll surface direction at a first roll surface speed; rotating an outer surface of the second roll in a second roll surface direction at a second roll surface speed wherein the second roll surface direction is the same as the first roll surface direction; contacting an elastomeric mix with the wedge; removing all or a portion of the elastomeric mix from the outer surface of the first roll; and transferring the elastomeric mix to the outer surface of the second roll.

In another exemplary embodiment, the present invention provides a calendering system for processing an elastomeric mix at a desired calendering rate. The system includes a first roll having an outer surface and rotatable along a first roll surface direction, and a second roll having an outer surface and rotatable along a second roll surface direction that is the same as the first roll surface direction. The second roll is positioned next to the first roll so as form a nip therebetween for the elastomeric mix. The nip has a centerline. A wedge is positioned downstream of, and adjacent to, the nip and at a predetermined distance D from the centerline of the nip. The wedge has a tip oriented towards the nip and configured to remove all, or a portion of, an elastomeric mix from the first roll and transfer the same to the second roll.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of the same reference numerals in different figures denotes the same or similar features.

DETAILED DESCRIPTION

Figure 1:
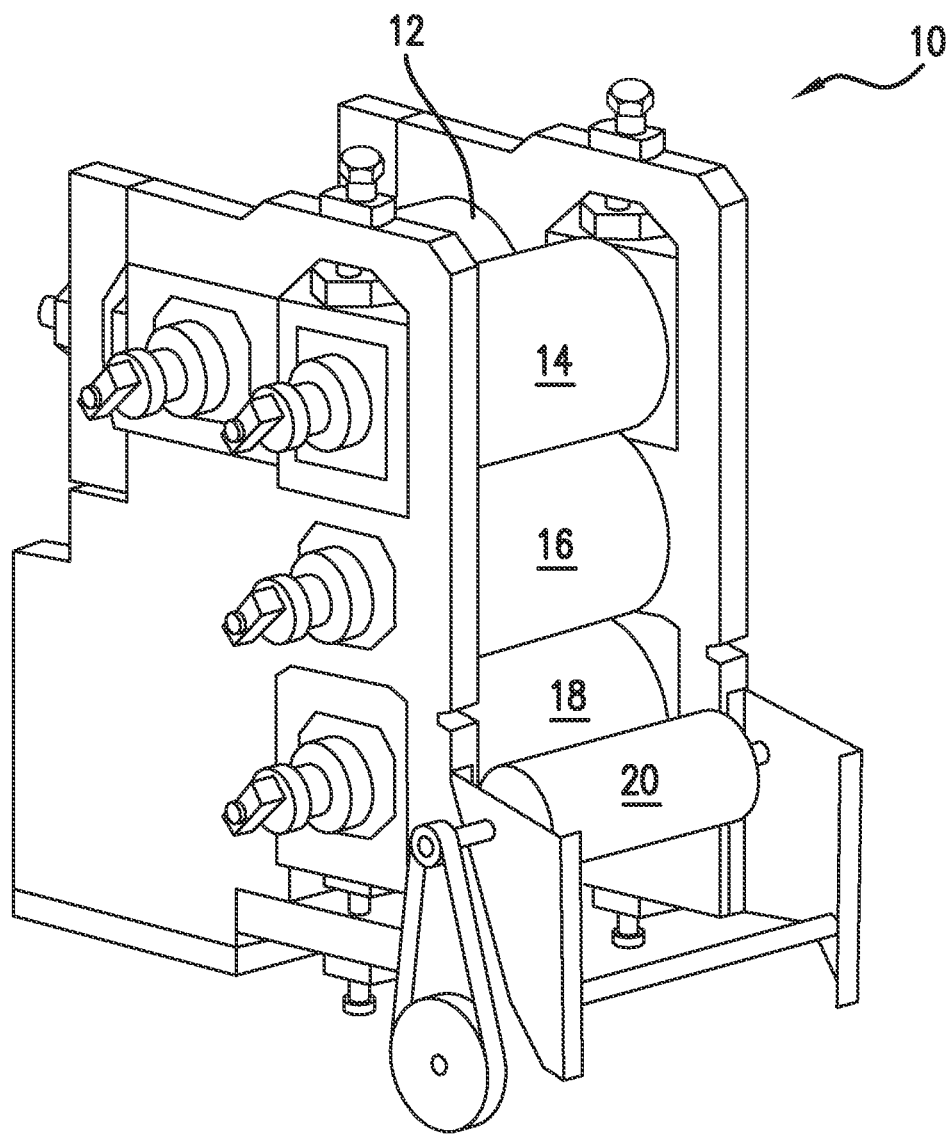
FIG. 1 illustrates a perspective view of an exemplary calendering operation.
Figure 2:
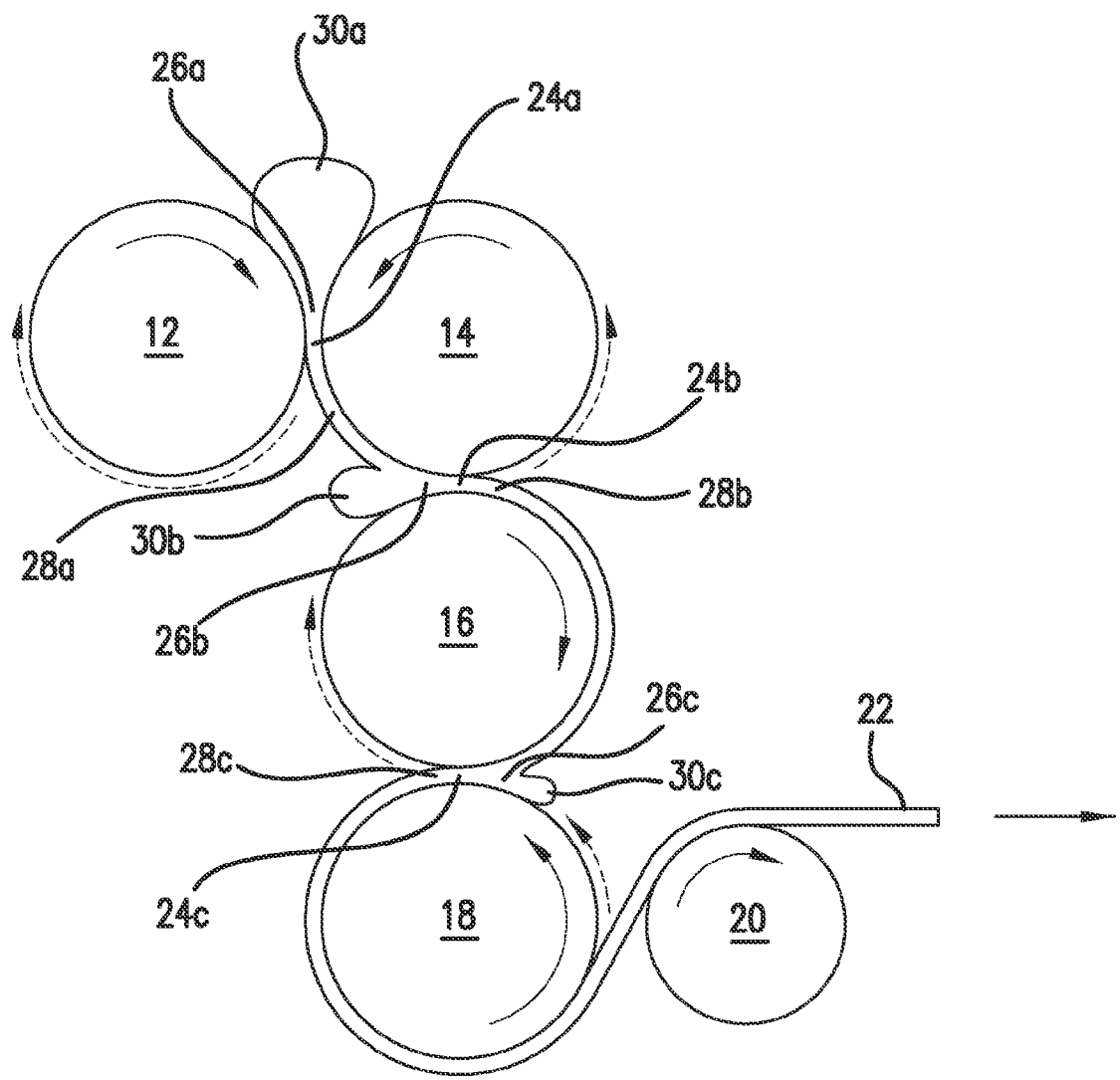
FIG. 2 is a side view of the rolls of the calendering apparatus shown in FIG. 1 with certain features removed to further reveal the position and operation of the rolls.
Figure 3:
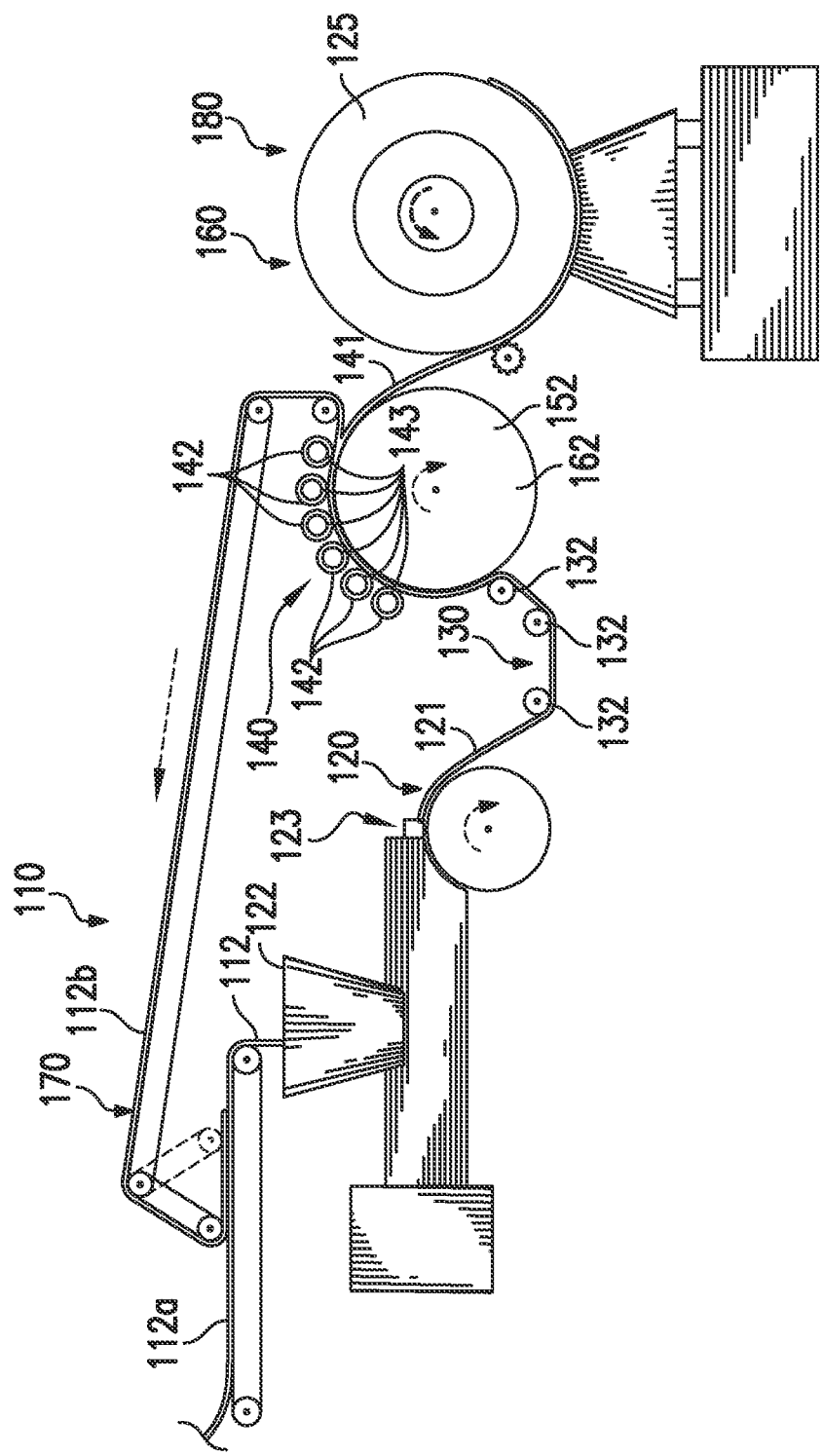
FIG. 3 illustrates an exemplary production center that uses a calendered sheet for making strips that are applied to a green tire to create the tread of the tire.

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

Figure 4:
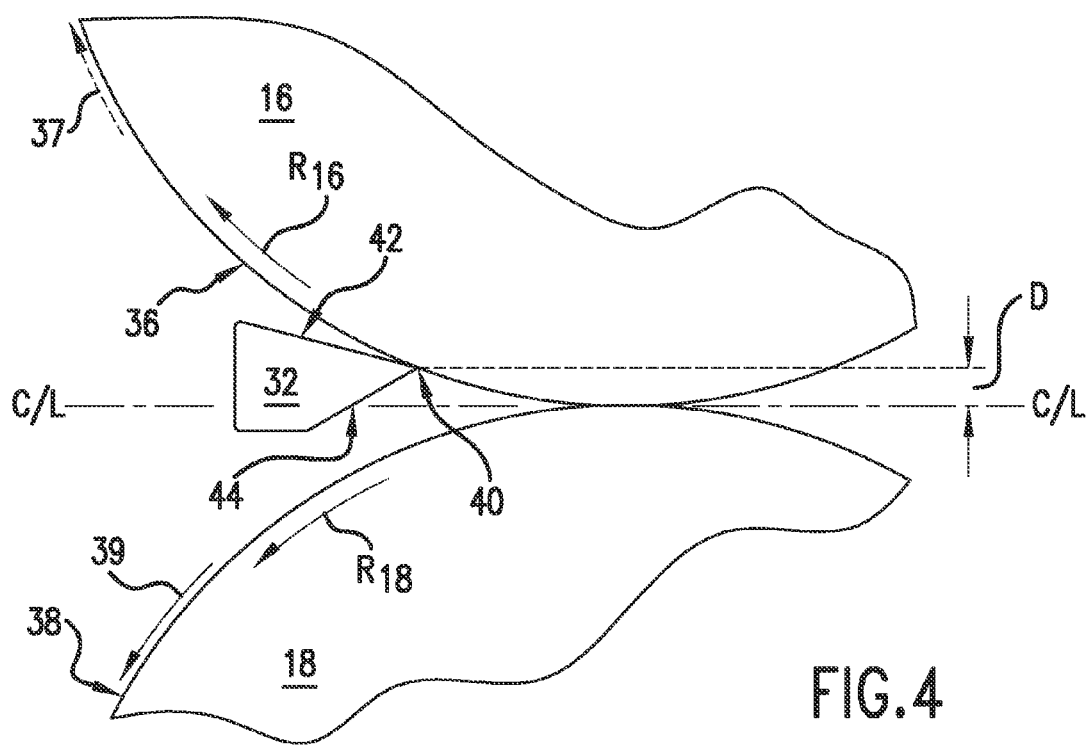
FIGS. 4-6 are side views of exemplary embodiments of the present invention.

FIG. 4 provides a side view of an exemplary embodiment of the present invention in which a wedge 32 with an edge or tip 40 is provided proximate and downstream to a nip formed by the pair of rolls 16 and 18 (which will also be referred to as first roll 16 and second roll 18 for purposes of describing the operation of wedge 32). Rolls 16 and 18 are chosen by way of example, as a wedge and its tip could be used at any one or more of the nips provided by calendering system 10.

First roll 16 and second roll 18 rotate in opposite directions. For example, from the vantage point of FIG. 4, first roll 16 rotates clockwise (arrow $R_{16}$) while second roll 18 rotates counter-clockwise (arrow $R_{18}$). For purposes of the describing this exemplary embodiment of the invention, it can be understood that the outer surface 36 of first roll 16 moves in a "first roll surface direction." The outer surface 38 of the second roll 18 moves in a "second roll surface direction," which is the same direction as the first roll surface direction. As a result, material exiting the nip formed by first roll 16 and second roll 18 is directed towards wedge 32. As described previously, preferably the material is transferred to second roll 18 and travels as indicated by arrow 39. However, during e.g., start-up operations, all (or an unacceptable portion) of the elastomeric mix of material may remain undesirably on first roll 16 as indicated by dashed arrow 37.

However, for this exemplary embodiment of the invention, material continuing on first roll 16 will come into contact with the tip 40 of wedge 32, which is positioned proximate to the nip and downstream thereof (in terms of the direction of flow of the elastomeric mix of material). As a result, all or some portion of the material will be removed from the outer surface of first roll 16 and transferred to the outer surface 38 of second roll 18 and travel as indicated by arrow 39. Wedge 32 also has a material directing surface 44 that faces toward second roll 18 and can assist with transferring the elastomeric mix of material to second roll 18.

Figure 8:
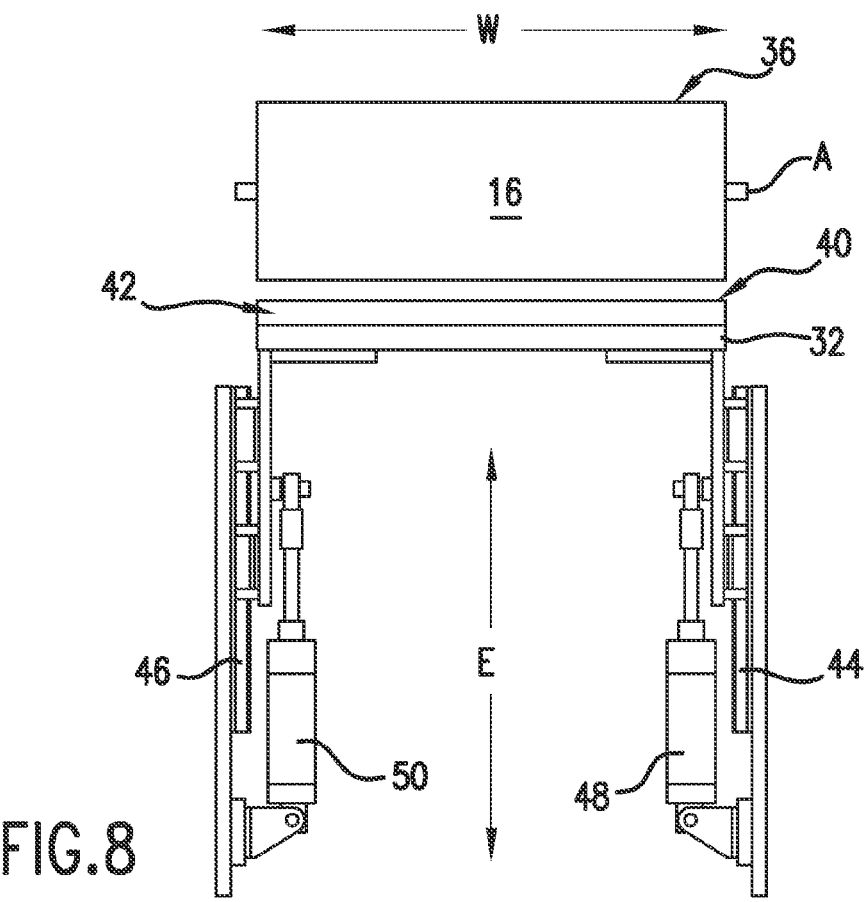

For this exemplary embodiment, tip 40 is in positioned in contact with the outer surface 36 of first roll 16. Additionally, wedge 32 is forced towards first roll 16 so as to urge tip 40 against first roll 16 with a certain amount of force. For example, as shown in FIG. 8, first roll 16 rotates about an axis A has a width W along its axial direction. The tip 40 of wedge 32 also has a corresponding width W along the axial direction A. For this exemplary embodiment, tip 40 is contacted against the outer surface 36 of first roll 16 with a force in the range of about 2 to about 6 Newtons per millimeter of axial width W of the first roll 16. In another exemplary embodiment, such force is about 4 Newtons per millimeter of axial width W of the first roll 16.

Tip 40 can also be provided as a relatively "sharp" tip or edge to assist in the removal of material. For example, in one embodiment of the invention, tip 40 is created with a radius of less than 1 mm. Other values may be used for the radius as well.

Wedge 32 can be made from material that will reduce the possibility of damaging the outer surface 36 of first roll 16. For example, wedge 32 can be made from a material such as e.g., brass that is "softer" than the material used for first roll 16. Alternatively, or in addition thereto, wedge 32 may treated with a coating or surface treatment that reduces the ability of the elastomeric mix material to stick or adhere to wedge 32. By way of example, wedge 32 may be constructed of a hardened steel to which a coating of Teflon® or other non-stick material has been applied. For example, the coating may be applied to tip 40, material directing surface 44, or both.

Referring again to FIG. 4, the nip created by first roll 16 and second roll 18 defines a centerline designated as C/L in FIG. 4. More particularly, centerline C/L is defined as a line that is centered in the nip between outer surfaces 36 and 38 and is perpendicular to a line passing through the axis of rotation of both first roll 16 and second roll 18. As shown, tip 40 is positioned at a predetermined distance D from centerline C/L as measured along a direction orthogonal to centerline C/L. In one exemplary embodiment of the invention, predetermined distance D is in the range of e.g., about 5 mm to about 15 mm.

Table II below provides experimental results of at least 14 trials conducted with elastomeric mixes 1 and 2 from Table 1 and a wedge 32 constructed and positioned according to the exemplary embodiment of FIG. 4. The surface speeds of first roll 16 and second roll 18 were varied relative to each other. A constant pressure was applied to first roll 16 using wedge 32.

TABLE II

| Mix | Trial # | First Roll 16 Speed | First Roll/ Second Roll Speed Ratio | Second Roll 18 Speed | Actuators pressure (bar) | Skim Thickness (mm) | OK/ NOK |
|---|---|---|---|---|---|---|---|
| 1 | 1 | 5.75 | 115% | 5.0 | 6 | 0.9 | OK |
|   | 2 | 5.75 | 115% | 5.0 | 6 | 0.9 | OK |
|   | 3 | 5.75 | 115% | 5.0 | 6 | 0.9 | OK |
|   | 4 | 5.75 | 115% | 5.0 | 6 | 0.9 | OK |
|   | 5 | 5.75 | 115% | 5.0 | 6 | 0.9 | OK |
|   | 6 | 4.25 | 85% | 5.0 | 6 | 0.9 | OK |
|   | 7 | 5.75 | 115% | 5.0 | 6 | 0.9 | OK |
|   | 8 | 11.50 | 115% | 10.0 | 6 | 0.9 | OK |
|   | 9 | 11.50 | 115% | 10.0 | 6 | 0.9 | OK |
| 2 | 10 | 5.75 | 115% | 5.0 | 6 | 0.9 | OK |
|   | 11 | 5.75 | 115% | 5.0 | 6 | 0.9 | OK |
|   | 12 | 4.25 | 85% | 5.0 | 6 | 0.9 | OK |
|   | 13 | 8.5 | 85% | 10.0 | 6 | 0.9 | OK |
|   | 14 | 11.5 | 115% | 10.0 | 6 | 0.9 | OK |

In Table II, the skim thickness refers to the thickness of the elastomeric mix travelling on the rolls. "OK" indicates that all or an acceptable portion of the material transferred from the first roll to the second roll after removal by the wedge while NOK indicates no transfer or an unacceptable amount of transfer. As indicated by Table II, the surface speeds of the rolls forming the nip did not affect the ability of wedge 32 to properly remove elastomeric mix from the first roll 16 so that the material could transfer to second roll 18.

Figure 5:
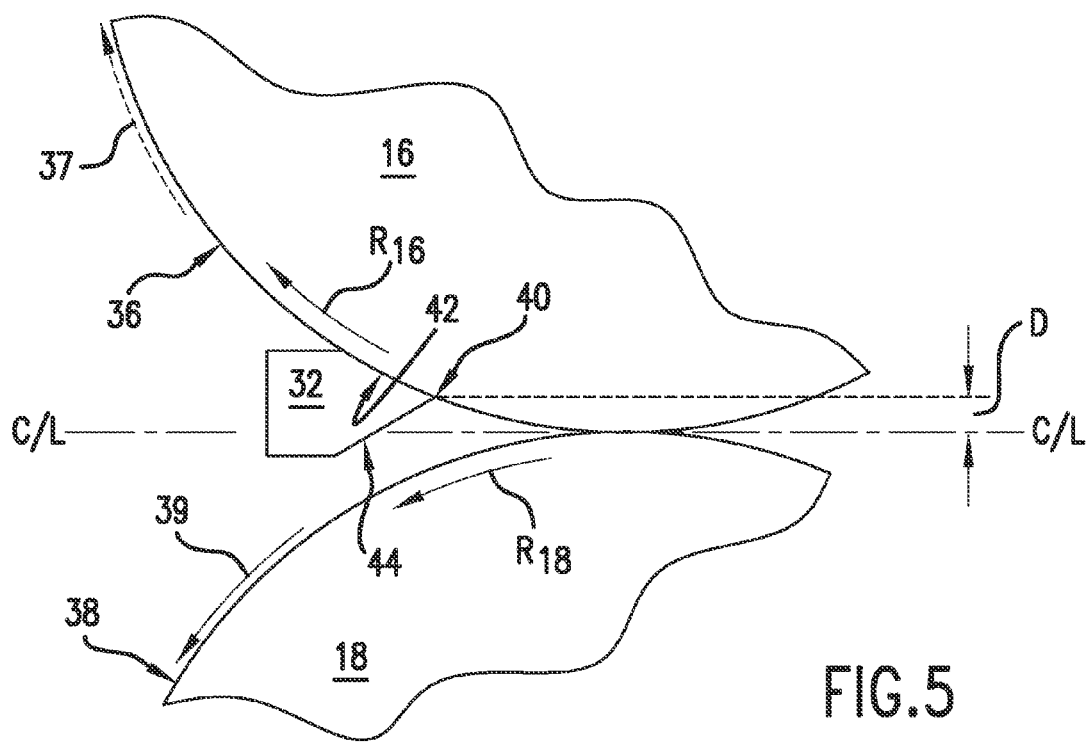

FIG. 5 provides another exemplary embodiment of wedge 32 positioned in the nip created by first roll 16 and second roll 18. This exemplary embodiment is similar to the exemplary embodiment of FIG. 4 except that wedge 32 has a different shape and is provided with an arcuate surface 42 that, along with tip 40, is placed in contact with the outer surface 36 of first roll 16. As with previous embodiments, wedge 32 is positioned adjacent and downstream of the nip and at a predetermined distance D from the centerline of the nip.

Figure 6:
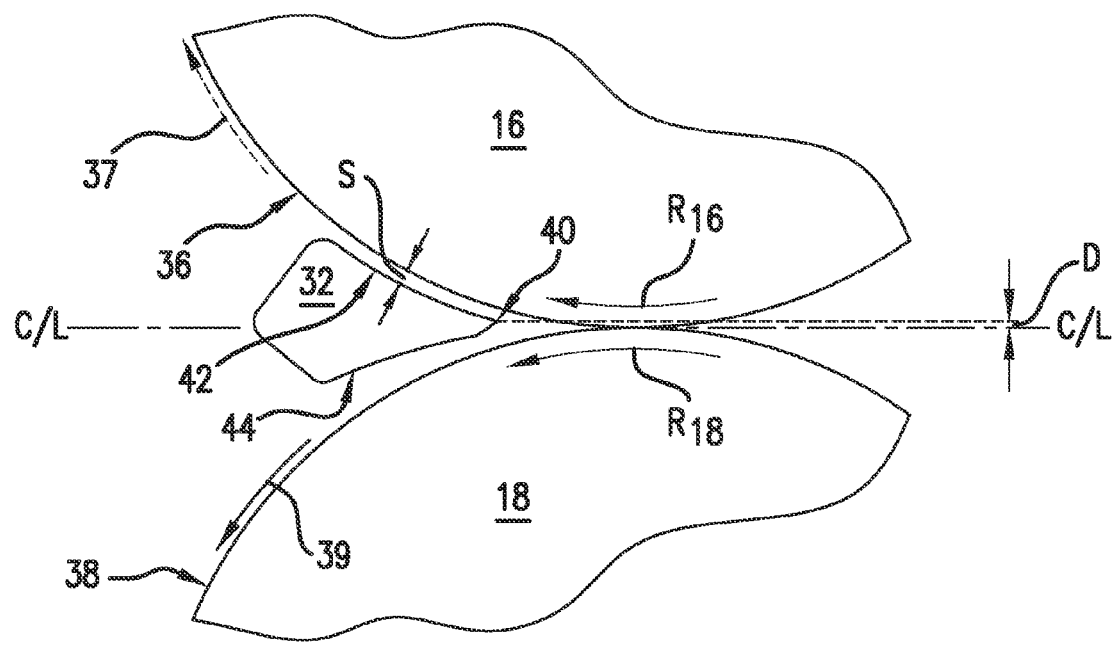

FIG. 6 provides another exemplary embodiment of wedge 32 positioned in the nip created by first roll 16 and second roll 18. This exemplary embodiment is also similar to the exemplary embodiment of FIG. 4 except that wedge 32 has a different shape and is provided with an arcuate surface 42. Additionally, unlike the embodiment of FIG. 4, tip 40 and arcuate surface 42 are not placed in contact with the outer surface 36 of first roll 16. Instead, a predetermined distance S is maintained between arcuate surface 42 and outer surface 36. S is measured along the radial direction of first roll 16 and is measured as the distance between outer surface 36 and the closest point on arcuate surface 42. Arcuate surface 42 is also constructed with the same radius of curvature as the outer surface 36 of first roll 16. Wedge 32 has a material directing surface 44 that is also arcuate so as to help further direct material towards second roll 18 after removal from first roll 16. As with previous embodiments, wedge 32 is positioned adjacent and downstream of the nip and at a predetermined distance D from the centerline of the nip.

Table IV below provides experimental results of at least 10 trials conducted with different thickness of elastomeric mix 1 from Table 1 and a wedge 32 constructed and positioned according to the exemplary embodiment of FIG. 6. The surface speeds of first roll 16 and second roll 18 were varied relative to each other as well as the predetermined distance S.

TABLE IV

| Mix | Trial # | First Roll 16 Speed | First Roll/ Second Roll Speed Ratio | Second Roll 18 Speed | Distance S (mm) | Skim Thickness (mm) | OK/ NOK |
|---|---|---|---|---|---|---|---|
| 1 | 1 | 3.2 | 156% | 5 | 0.25 | 0.8 | NOK |
|   | 2 | 3.2 | 156% | 5 | 0.25 | 0.8 | NOK |
|   | 3 | 3.2 | 156% | 5 | 0.25 | 0.8 | NOK |
|   | 4 | 3.2 | 156% | 5 | 0 | 0.8 | OK |
|   | 5 | 3.2 | 83% | 5 | 0 | 1.0 | OK |
|   | 6 | 6 | 83% | 5 | 0 | 1.0 | OK |
|   | 7 | 6 | 80% | 5 | 0 | 1.0 | OK |
|   | 8 | 50 | 80% | 40 | 0 | 1.0 | OK |
|   | 9 | 75 | 80% | 60 | 0 | 1.0 | OK |
|   | 10 | 100 | 80% | 80 | 0 | 1.0 | OK |

As indicated by Table IV, the surface speeds of the rolls forming the nip did not affect the ability of wedge 32 to properly remove elastomeric mix from the first roll 16 so that the material could transfer to second roll 18. Contact between wedge 32 and first roll 16 was required in order to successfully remove and transfer the desired amount of elastomeric mix material. However, the inventor believes this is the result of imperfections in the shape of the arcuate surface 42 of wedge 32 used for the trials and that a surface 32 more closely matched to the shape of first roll 16 will work. For example, it is believed that using a precision ground surface 32 will likely work but will be more expensive.

A wedge can be similarly positioned downstream and adjacent to each the nips created by the rolls 12, 14, 16, 18, and 20 (or any combination thereof) to ensure that the elastomeric mix material is properly routed after exiting each nip. For example, a wedge could be configured with a first roll 12 and second roll 14 and/or first roll 14 and second roll 16, and so on. Also, the wedge can be left in position after start-up and during the calendering process or could be withdrawn after start-up.

Figure 7:
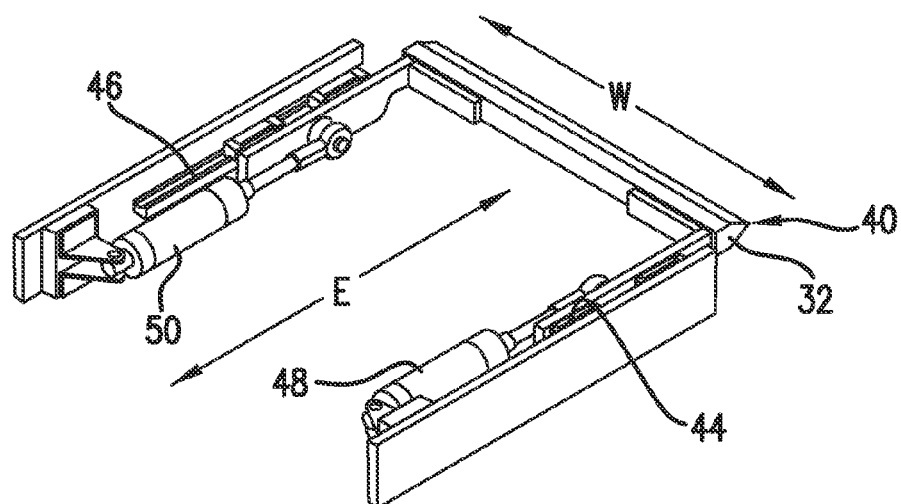
FIG. 7 is a perspective view and FIG. 8 is a top view of an exemplary assembly for extending and retracting an exemplary wedge relative to a nip of a calendering system.

For example, FIGS. 7 and 8 illustrate a retractable mounting mechanism for positioning the tip 40 of wedge 32 into contact with a first roll 16. A pair of pneumatic or hydraulic actuators 48 and 50 are mechanically connected with a pair of slide assemblies 44 and 48 that carry wedge 32. The slide assemblies contain rollers or bearings that allow the slides to readily extend wedge 32 into contact with first roll 16 and retract wedge 32 from roll 16 under the power of actuators 48 and 50. Accordingly, calendering system 10 can be provided with e.g., a processing device or controller to extend wedge 32 into contact with first roller 16 during start-up and maintain its position until the elastomeric mix material has been properly threaded. Wedge 32 can then be retracted or allowed to remain in place if desired.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for operating a calendering system that processes elastomeric mixes at a desired calendering rate, the calendering system comprising a first roll and a second roll that form a nip therebetween, said method comprising the following steps:
   providing a wedge with an angled tip;
   positioning the tip of the wedge adjacent to, and downstream of, the nip;
   rotating an outer surface of the first roll in a first roll surface direction at a first roll surface speed;
   rotating an outer surface of the second roll in a second roll surface direction at a second roll surface speed wherein the second roll surface direction is the same as the first roll surface direction;
   contacting an elastomeric mix with the wedge;
   removing all or a portion of the elastomeric mix from the outer surface of the first roll by the contact between the elastomeric mix and the wedge; and
   transferring the elastomeric mix removed from the outer surface of the first roll to the outer surface of the second roll.

2. A method for operating a calendering system as in claim 1, wherein the tip is positioned at a predetermined distance D from the centerline of the nip, and wherein said predetermined distance D is in the range of about 5 mm to 15 mm as measured along a direction orthogonal to the centerline of the nip.

3. A method for operating a calendering system as in claim 2, wherein said positioning step further comprises contacting the tip of the wedge against the outer surface of the first roll.

4. A method for operating a calendering system as in claim 2, wherein the first roll has an axial width, and wherein said step of positioning further comprises contacting the tip of the wedge against the outer surface of the first roll with a force in the range of about 2 to about 6 Newtons per millimeter of axial width of the first roll.

5. A method for operating a calendering system as in claim 2, further comprising the steps of:
   providing the wedge with an arcuate contact surface; and
   placing the arcuate contact surface of the wedge in contact with the outer surface of the first roll.

6. A method for operating a calendering system as in claim 5, wherein the arcuate contact surface of the wedge has a radius of curvature that is substantially the same as a radius of curvature of the outer surface of the first roll.

7. A method for operating a calendering system as in claim 2, further comprising the steps of:
   providing the wedge with an arcuate surface; and
   placing the arcuate contact surface of the wedge at a predetermined distance S from the outer surface of the first roll.

8. A method for operating a calendering system as in claim 7, wherein the predetermined distance S in the range of about 0 mm to about 0.5 mm.

9. A method for operating a calendering system as in claim 8, wherein the arcuate contact surface of the wedge has a radius of curvature that is substantially the same as a radius of curvature of the outer surface of the first roll.

10. A method for operating a calendering system as in claim 1, further comprising the step of retracting the wedge away from the first roll after said step of transferring.

11. A method for operating a calendering system as in claim 1, further comprising the step of applying a coating to the tip of the wedge to limit sticking of the elastomeric mix to the tip.

12. A method for operating a calendering system as in claim 1, wherein the wedge has a material directing surface facing the second roll, and further comprising the step of applying a coating to the tip of the wedge and the material directing surface so as to limit sticking of the elastomeric mix to the tip.

13. A method for operating a calendering system that processes elastomeric mixes, the calendering system comprising a first roll and a second roll that form a nip therebetween, the method comprising the steps of:
   providing a wedge with an angled tip, the wedge positioned along a centerline that is centered in the nip between an outer surface of the first roll and an outer surface of the second roll, the centerline being perpendicular to a line pass through the axis of rotation of both the first roll and the second roll;
   positioning the tip of the wedge adjacent to, and downstream of, the nip;
   rotating the outer surface of the first roll in a first roll surface direction at a first roll surface speed;
   rotating the outer surface of the second roll in a second roll surface direction at a second roll surface speed wherein the second roll surface direction is the same as the first roll surface direction;
   contacting an elastomeric mix with the wedge to remove all or a portion of the elastomeric mix from the outer surface of the first roll; and
   transferring the elastomeric mix removed from the outer surface of the first roll to the outer surface of the second roll.

* * * * *